United States Patent
Law et al.

(10) Patent No.: US 10,571,068 B2
(45) Date of Patent: Feb. 25, 2020

(54) MOBILE DEVICE STAND WITH ADAPTIVE MOUNTING ARRANGEMENT

(71) Applicants: Man Cho Nicholas Law, Torrance, CA (US); Man Shing Nathaniel Law, Torrance, CA (US)

(72) Inventors: Man Cho Nicholas Law, Torrance, CA (US); Man Shing Nathaniel Law, Torrance, CA (US)

(*) Notice: Subject to any disclaimer, the term of this patent is extended or adjusted under 35 U.S.C. 154(b) by 83 days.

(21) Appl. No.: 15/686,138

(22) Filed: Aug. 24, 2017

(65) Prior Publication Data

US 2019/0063667 A1    Feb. 28, 2019

(51) Int. Cl.
| | | |
|---|---|---|
| *F16M 11/10* | (2006.01) | |
| *F16B 2/06* | (2006.01) | |
| *H04M 1/04* | (2006.01) | |
| *F16M 13/02* | (2006.01) | |
| *F16M 11/04* | (2006.01) | |
| *F16M 13/00* | (2006.01) | |

(52) U.S. Cl.
CPC ............... *F16M 11/10* (2013.01); *F16B 2/06* (2013.01); *F16M 11/041* (2013.01); *F16M 13/00* (2013.01); *F16M 13/02* (2013.01); *F16M 13/022* (2013.01); *H04M 1/04* (2013.01)

(58) Field of Classification Search
CPC ........... F16M 11/10; F16M 13/02; F16B 2/06; H04M 1/04
See application file for complete search history.

(56) References Cited

U.S. PATENT DOCUMENTS

| | | | | |
|---|---|---|---|---|
| 6,062,518 | A  * | 5/2000 | Etue ..................... | B60R 11/0241 224/542 |
| 7,422,184 | B2 * | 9/2008 | Carnevali .............. | B60N 3/103 220/737 |
| 7,954,773 | B2 * | 6/2011 | Carnevali .............. | B60N 3/103 220/737 |
| 9,108,096 | B2 * | 8/2015 | Solheim ............ | A63B 69/3632 |
| 9,420,712 | B2 * | 8/2016 | Yang ..................... | F16M 11/041 |
| 9,924,005 | B1 * | 3/2018 | McElderry .............. | H04M 1/04 |
| 2014/0110544 | A1 * | 4/2014 | Chang .................. | F16M 11/041 248/207 |

* cited by examiner

Primary Examiner — Anita M King
(74) Attorney, Agent, or Firm — Tsz Lung Yeung

(57) ABSTRACT

A mobile device stand includes a supporting stand, an adjustable frame and an adaptive mounting arrangement. The adaptive mounting arrangement includes a mounting connector provided on the adjustable frame. The mounting connector includes a tubular mounting member having a mounting cavity. The mobile device stand is selectively operated between a stationary mode and a mobile mode. In the stationary mode, the tubular mounting member is arranged to detachably attach on the base member so as to detachably mount the adjustable frame on the supporting stand. In the mobile mode, the tubular mounting member is arranged to securely and detachably mount on a cap portion of a bottle so as to detachably mount the adjustable frame on the bottle.

2 Claims, 6 Drawing Sheets

MOBILE DEVICE STAND WITH ADAPTIVE MOUNTING ARRANGEMENT

BACKGROUND OF THE PRESENT INVENTION

Field of Invention

The present invention relates to an accessory for an electronic mobile device such as a smartphone, and more particularly to a mobile device stand comprising an adaptive mounting arrangement which is capable of selectively mounting a mobile device on a supporting stand or an external object, such as a cap portion of a bottle.

Description of Related Arts

There exist a wide range of cellphone stands throughout the world. For example, a conventional cellphone stand may comprise a supporting base and a mounting frame movably connected to the supporting base. The supporting base may be securely mounted or affixed on an external object, such as a driver's dashboard of a vehicle. The mounting frame may movably extend from the supporting base. An mobile device or a smart phone may adjustably accommodate in or support on the mounting frame while it is supported by the supporting base.

There exists a number of disadvantages in association with the above-mentioned conventional cellphone stand. First, the supporting stand mentioned above may only be mounted to a designated or specified external object. For example, some supporting stands may be designed for use to attach on a driver's dashboard or on a glass surface of a windshield. However, some other supporting stands may be designed for use in vents. The result is that the cellphone may only be mounted on designated or specified external objects.

Second, conventional cellphone stands are not designed for portable use. That means once the supporting stand is mounted on the designated external object, the user is not expected to frequently detach the cellphone stand and use it elsewhere. Thus, conventional cellphone stands do not have any structural design which facilitate users to use the stand in a portable and mobile manner.

As a result, there is a need to develop a mobile device stand which may be used for mounting an electronic device such as a smartphone on several external objects, and which is selectively portable.

SUMMARY OF THE PRESENT INVENTION

Certain variations of the present invention provide a mobile device stand comprising an adaptive mounting arrangement which is capable of selectively mounting a mobile device on a supporting stand or an external object, such as a cap portion of a bottle.

Certain variations of the present invention provide a mobile device stand comprising a supporting base, an adjustable frame, and an adaptive mounting arrangement for detachably mounting the adjustable frame on the supporting base.

Certain variations of the present invention provide a mobile device stand comprising a supporting base, an adjustable frame, and an adaptive mounting arrangement, wherein the adaptive mounting arrangement may selectively mount the adjustable frame on the supporting base or on an external object, such as a cap portion of a bottle-shaped object.

In one aspect of the present invention, it provides a mobile device stand for supporting a mobile device on an external object, comprising:

a supporting stand which comprises a base member for detachably mounting on the external object;

an adjustable frame having a supporting platform, the adjustable frame being adapted for detachably and adjustably mounting the mobile device; and an adaptive mounting arrangement, which comprises a mounting connector provided on the adjustable frame, and comprising a tubular mounting member having a mounting cavity, the mobile device stand being selectively operated between a stationary mode and a mobile mode, wherein in the stationary mode, the tubular mounting member is arranged to detachably attached on the base member so as to detachably mount the adjustable frame on the supporting stand, wherein in the mobile mode, the tubular mounting member is arranged to securely and detachably mount on a cap portion of a bottle through insertion of the cap portion in the mounting cavity so as to detachably mount the adjustable frame on the bottle.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
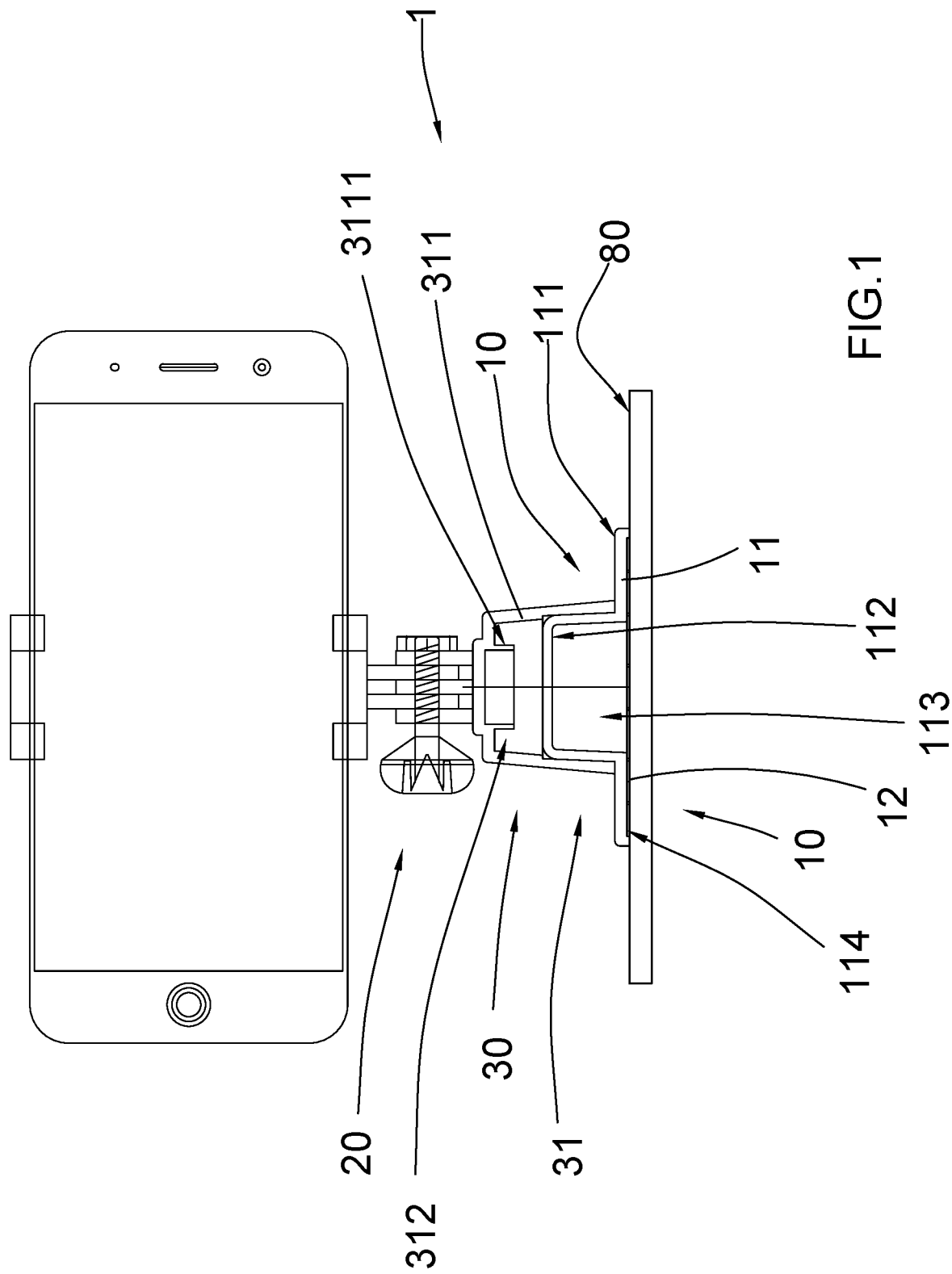
FIG. 1 is a front view of a mobile device stand according to a preferred embodiment of the present invention, illustrating that the mobile device stand is in stationary mode.
Figure 2:
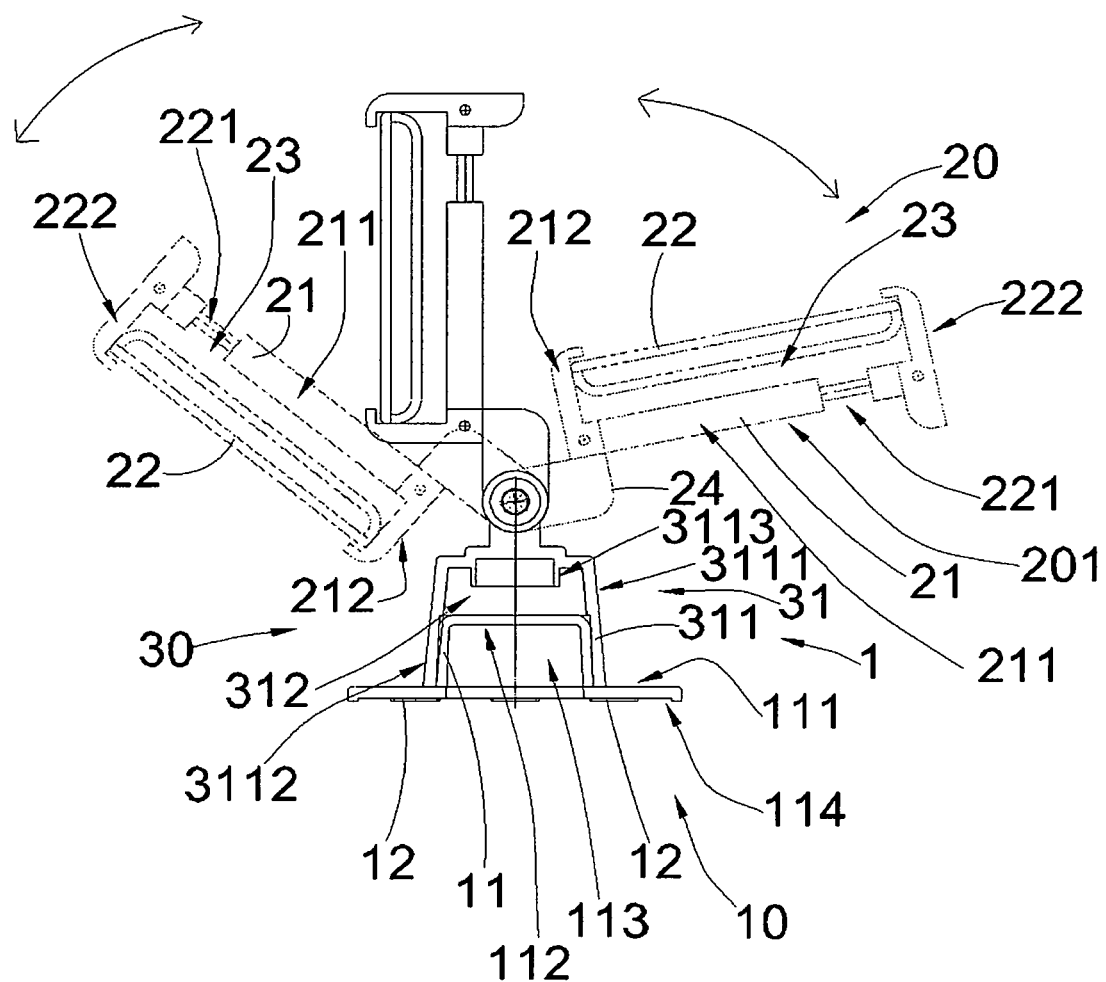
FIG. 2 is a side view of the mobile device stand according to the preferred embodiment of the present invention, illustrating that the mobile device stand is in the stationary mode.
Figure 3:
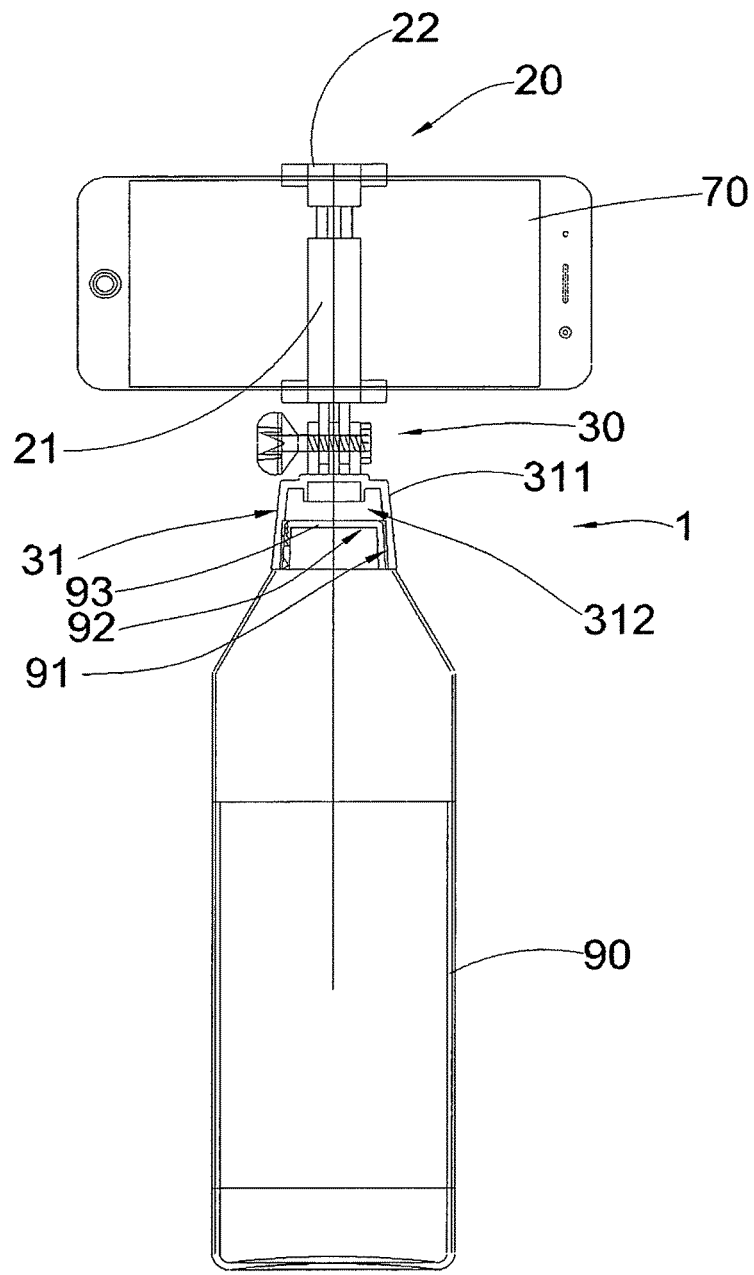
FIG. 3 is a front view of a mobile device stand according to the preferred embodiment of the present invention, illustrating that the mobile device stand is in mobile mode.

Referring to FIGS. 1 to 3 of the drawings, a mobile device stand 1 according a preferred embodiment of the present invention is illustrated. Broadly, the mobile device stand 1 may comprise a supporting stand 10, an adjustable frame 20, and an adaptive mounting arrangement 30. The mobile device stand 1 may be configured and designed for supporting a mobile device 70 such as a smartphone on an external object 80 such as a flat surface formed on a vehicle's dashboard.

The supporting stand 10 may comprises a base member 11 for detachably mounting on the external object 80.

The adjustable frame 20 may have a supporting platform 201. The adjustable frame may be adapted for detachably and adjustably mounting the mobile device 70 on the supporting platform 201.

The adaptive mounting arrangement 30 may comprise a mounting connector 31 provided on the adjustable frame 20.

The mounting connector 31 may be provided on the adjustable frame 20, and may comprise a tubular mounting member 311 having a mounting cavity 312. The mobile device stand 1 may be selectively operated between a stationary mode and a mobile mode, wherein in the stationary mode, the tubular mounting member 311 is arranged to be detachably attached on the base member 11 so as to detachably mount the adjustable frame 20 on the supporting stand 10, wherein in the mobile mode, the tubular mounting member 311 may be arranged to securely and detachably mount on a cap portion 91 of a bottle 90 through insertion of the cap portion 91 in the mounting cavity 312 so as to detachably mount the adjustable frame 20 on the bottle 90.

According to the preferred embodiment of the present invention, the supporting stand 10 may be detachably and securely attached or connected to the external object 80, which may include a flat surface of a vehicle's dashboard. The base member 11 may be arranged to be in direct physical contact with the external object 80 and the base member 11 may be affixed on the external object 80 through conventional connectors, such as screws, suction pads, or adhesive layers. Other connectors may also be possible. The goal is to securely connect or affix the supporting stand 10 on the external object 80.

As shown in FIG. 1 of the drawings, the base member 11 may have a peripheral mounting portion 111 and an engagement mounting portion 112 upwardly and integrally extended from the peripheral mounting portion 111. The peripheral mounting portion 111 and the engagement mounting portion 112 may each have a circular cross section when viewed from the top of the mobile device stand 1. The engagement mounting portion 112 may have form a hollow structure and have a central cavity 113. The engagement mounting portion 112 may be sized and shaped to correspond to that of the tubular mounting member 311.

The supporting stand 10 may have a plurality of connectors 12 provided on a bottom surface 114 of the peripheral mounting portion 111 of the base member 11 for connecting with the external object 80. As mentioned above, the connectors 12 may take a wide variety of forms. However, in the preferred embodiment of the present invention, each of the connectors 12 may be configured as adhesive elements which may attach on the external object 80, such as a flat surface of a vehicle's dashboard. As mentioned earlier, other forms of connecting mechanism are also possible.

The adjustable frame 20 may be configured to detachably hold a mobile device 70, such as a smartphone, a tablet computer, or even a digital camera. Specifically, the adjustable frame 20 may comprise a connecting frame member 24 movably mounted to the tubular mounting member 311 of the mounting connector 31 in such a manner that the stationary clamping member 21 may pivotally move with respect to a transverse axis thereof. The adjustable frame 20 may further comprise a stationary clamping member 21 connected to the connecting frame member 24, and a movable clamping member 22 movably mounted on the stationary clamping member 21 for defining a clamping cavity 23 formed between the stationary clamping member 21 and the movable clamping member 22. The mobile device 70 may be clamped in the clamping cavity 23. The connecting frame member 24 may be movably mounted to the engagement mounting portion 112 of the base member 11 through a screw or other connecting member.

As shown in FIG. 2 of the drawings, the stationary clamping member 21 may have a first longitudinal portion 211 and a first transverse portion 212 extended from a lower end of the first longitudinal portion 211 to form a substantially L-shape contour. On the other hand, the movable clamping member 22 may have a second longitudinal portion 221 slidably and adjustably mounted on the first longitudinal portion 211 of the stationary clamping member 21, and a second transverse portion 222 extended from an upper end of the second longitudinal portion 211. Since the first longitudinal portion 211 is slidably and movably connected to the second longitudinal portion 221, a vertical distance between the first transverse portion 212 and the second transverse portion 222 may be adjusted by slidably moving the second longitudinal portion 221 of the movable clamping member 22 with respect to the first longitudinal portion 211 of the stationary clamping member 21. In this preferred embodiment, the second longitudinal portion 221 may be slidably and partially embedded into the first longitudinal portion 211 so as to adjust the vertical distance between the first transverse portion 212 and the second transverse portion 222.

The tubular mounting member 311 of the adaptive mounting arrangement 30 may be sized and shaped to fittedly engage with the engagement mounting portion 112 of the base member 11. As shown in FIG. 2 of the drawings, the tubular mounting member 311 may be connected to the connecting frame member 24 of the adjustable frame 20 so as to detachably connect the adjustable frame 20 on the supporting stand 10. When the mobile device stand 1 is in the stationary mode, the engagement mounting portion 112 may be fittedly accommodated in the mounting cavity 312 of the tubular mounting member 311. The entire engagement mounting portion 112 may be received in the mounting cavity 312. In order to ensure tight and secure engagement between the engagement mounting portion 112 and the tubular mounting member 311, an internal diameter of the mounting cavity 312 may be slightly smaller than that of external diameter of the engagement mounting portion 112. Thus, the engagement mounting portion 112 and the mounting cavity 312 may have a substantially circular cross section when view from the top or from the bottom. Other cross-sectional shapes may also be possible.

Moreover, the tubular mounting member 311 may a tapered cross-sectional shape when viewed from the front or from the side so that a diameter of the tubular mounting member 311 may be gradually increasing from a top portion 3111 to a bottom portion 3112 (i.e. from the adjustable frame 20 towards the base member 11).

In addition, the tubular mounting member 311 may further have a securing seat 3113 formed at a top portion 3111 thereof. The securing seat 3113 may form a protrusion in the mounting cavity 312 for being inserted into a bottle opening 92 of the bottle 90.

As shown in FIG. 3 of the drawings, when the mobile device stand 1 is in the mobile mode, the tubular mounting member 311 may engage with the cap portion 91 of a bottle 90, such as a water bottle. Thus, the mounting cavity 312 may be shaped and sized to fittedly accommodate at least the cap portion 91 of a bottle 90. The tubular mounting member 311 may be configured from flexible or elastic material so that it may have inherent elasticity to grab on at least the cap portion 91 of the bottle 90.

The operation of the present invention is as follows: when the mobile device stand 1 is in the stationary mode, the adjustable frame 20 and the tubular mounting member 311 may engage with the engagement mounting portion 112 of the base member 11, which may be mounted on a vehicle's dashboard as the external object 80. The user may then mount the mobile device 70 such as his smartphone on the adjustable frame 20.

When the mobile device stand 1 is in the mobile mode, a user may detach the tubular mounting member 311 from the base member 11 and carry the adjustable frame 20 and the tubular mounting member 311 to other places. When a stand for the mobile device 70 is desired, the user may engage the tubular mounting member 311 to the cap portion 91 of the bottle 90, which may be filled with water or other liquid so that the bottle 90 may have sufficient weight to support the mobile device 70 as a temporary stand. When the user finishes using the mobile device 70, he may simply detach the tubular mounting member 311 from the cap portion 91 and go to other places. When the user returns to his vehicle, he may again use the mobile device stand 1 in the stationary mode described above.

The mobile device stand 1 may be used in conjunction with plastic or glass bottle 90. For plastic bottle such as a typical disposable water bottle, the cap 93 may be mounted to the cap portion 91, and the tubular mounting member 311 may cover the entire cap 93 when in the mobile mode. When the present invention is used in conjunction with glass bottle such as a glass bottle containing soft drink or beer, the cap 93 may be removed from the bottle 90 and when the tubular mounting member 311 is mounted on the bottle 90, the securing seat 3113 may be inserted into the bottle 90 through the bottle opening 92. The securing seat 3113 may help in securing the adjustable frame 20 on the bottle 90.

Figure 4:
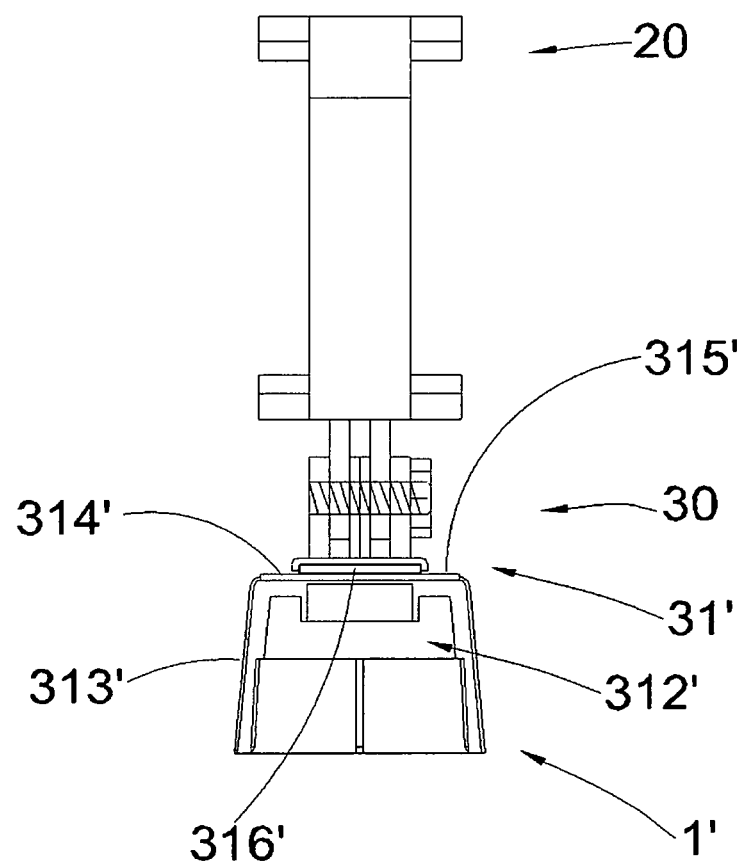
FIG. 4 is a first alternative mode of the mobile device stand according to the preferred embodiment of the present invention.

Referring to FIG. 4 of the drawings, a first alternative mode of the mobile device stand 1' according to a first alternative mode of the present invention is illustrated. The first alternative mode is similar to the preferred embodiment as described above, except the tubular mounting member 31'. According to the first alternative mode, the tubular mounting member 31' may comprise a first mount 313' and a second mount 314' detachably attached on the first mount 313' for detachably mounting the adjustable frame 20 on the supporting stand 10.

Specifically, the first mount 313' may be configured to have a tubular structure in which the mounting cavity 312' may be formed within the first mount 313'. The engagement mounting portion 112 of the base member 11 may be fittedly and detachably accommodated in the mounting cavity 312' in the same manner when the tubular mounting member 31 is attached on the base member 11 in the preferred embodiment described above. The tubular mounting member 31' may further comprise a first magnetic element 315' provided on a top portion thereof.

On the other hand, the tubular mounting member 31' may further comprise a second magnetic element 316' provided on the second mount 314', wherein the first magnetic element 315' and the second magnetic element 316' may magnetically attract to each other. Thus, at least one of the first magnetic element 315' and the second magnetic element 316' may be configured from magnet while the other may be configured as metal. Alternatively, both of the first magnetic element 315' and the second magnetic element 316' may be configured from magnet having opposite polarities. The effect is to allow the first magnetic element 315' to be magnetically attracted to the second magnetic element 316'.

The second mount 314' may be attached or connected on the connecting frame member 24 of the adjustable frame 20 so that the first mount 313' and the second mount 314' may detachably connect the adjustable frame 20 on the supporting stand 10 through magnetic force. A user may be able to freely detach the adjustable frame 20 and the second mount 314' from the first mount 313' which may be detachably mounted on the engagement mounting portion 112 of the base member 11.

Figure 5A:
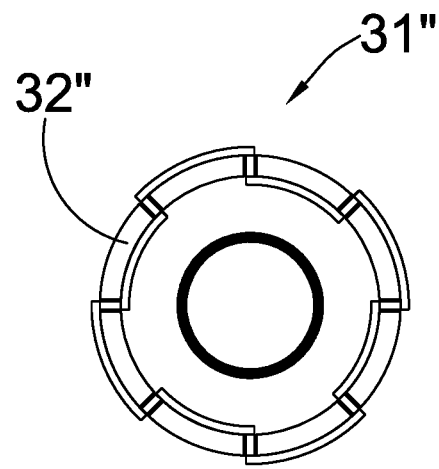
FIG. 5A and FIG. 5B are schematic diagrams of a second alternative mode of the mobile device stand according to the preferred embodiment of the present invention.
Figure 5B:
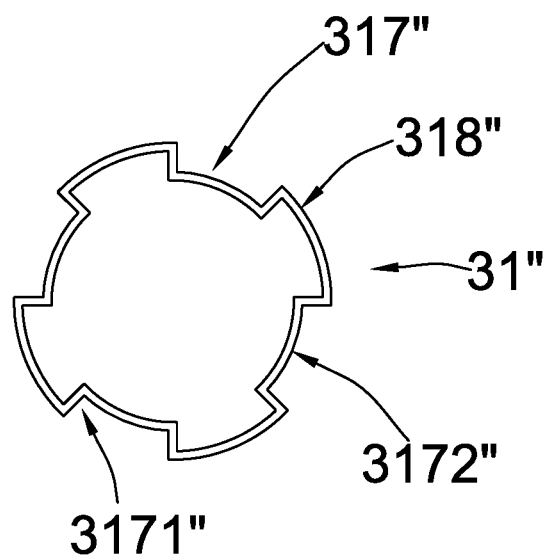

Referring to FIG. 5A and FIG. 5B of the drawings, a second alternative mode of the mobile device stand according to the preferred embodiment of the present invention is illustrated. The second alternative mode is similar to the preferred embodiment as described above except the tubular mounting member 31" of the adaptive mounting arrangement 30". According to the second alternative mode, the tubular mounting member 31" may have a plurality of elongated slots 317" indently formed from a sidewall 318" thereof along a longitudinal direction of the tubular mounting member 31". The outer sidewall 318" may have a generally curved cross sectional shape when viewed from the top so that the tubular mounting member 31" thus forming a curved contour between each two elongated slots 317". Each elongated slot 317" may be defined or surrounded by two side surfaces 3171" and an inner surface 3172". The inner surface 3172" may have curved contour which is substantially the same as that of the outer sidewall 318". The tubular mounting member 31" may be structurally identical to that disclosed in the preferred embodiment, except the cross sectional shape of it.

The adaptive mounting arrangement 30" may further comprise a reinforcing ring 32" detachably attached on the outer sidewall 318" of the tubular mounting member 31". The reinforcing ring 32" may be circular in shape and may have certain elasticity for normally exerting an inward biasing force on the outer sidewall 318" thereof. When the tubular mounting member 31" is mounted on the bottle 90 or the base member 11, the reinforcing ring 32" may exert elastic force towards a center thereof so as to reinforce a mounting strength of the tubular mounting member 31" on the bottle 90 or the base member 11.

Figure 6A:
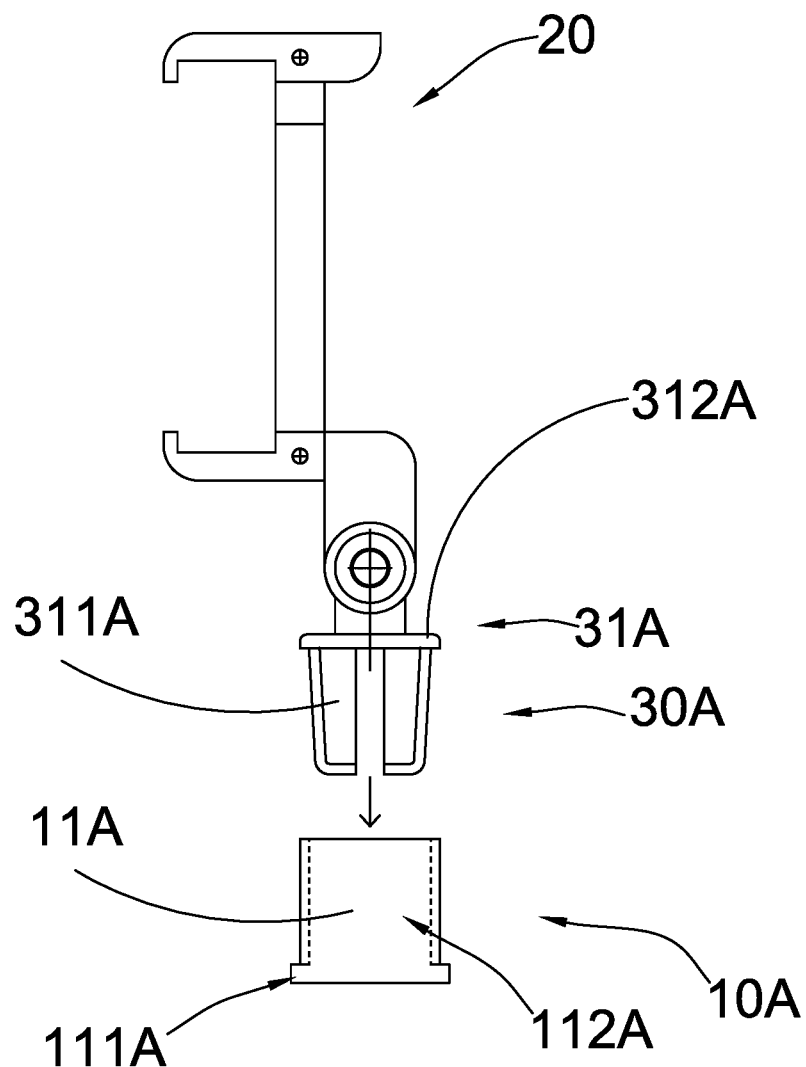
FIG. 6A and FIG. 6B are schematic diagrams of a third alternative mode of the mobile device stand according to the preferred embodiment of the present invention.
Figure 6B:
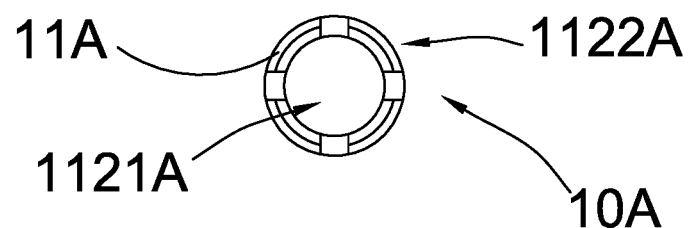

Referring to FIG. 6A to FIG. 6B of the drawings, a third alternative mode of the mobile device stand according to the preferred embodiment of the present invention is illustrated. The third alternative mode is similar to the preferred embodiment, except the adaptive mounting arrangement 30A and the supporting stand 10A. According to the third alternative mode, the adaptive mounting arrangement 30A may comprise a mounting connector 31A which may comprise a connector cap 312A and a plurality of mounting legs 311A extended from the connector cap 312A for engaging with the supporting stand 10A or the bottle 90. On the other hand, the supporting stand 10A may comprise a base member 11A which may have a peripheral mounting portion 111A and an engagement mounting portion 112A upwardly and integrally extended from the peripheral mounting portion 111A. The peripheral mounting portion 111A and the engagement mounting portion 112A may each have a circular cross section when viewed from the top of the mobile device stand 1. The engagement mounting portion 112A may have an engagement cavity 1121A and an engagement opening 1122A. The mounting legs 311A may be arranged to engage with the engagement mounting portion 112A in such a manner that the mounting legs 311A may be arranged to selectively receive in the engagement cavity 1121A.

When the mobile device stand 1 is in the mobile mode, the mounting legs 311A may be arranged to be inserted into the bottle 90 while the connector cap 312A may be arranged to engage with the bottle opening of the bottle 90.

The present invention, while illustrated and described in terms of a preferred embodiment and several alternatives, is not limited to the particular description contained in this specification. Additional alternative or equivalent components could also be used to practice the present invention.

What is claimed is:

1. A mobile device stand for supporting a mobile device on an external object, comprising:

a supporting stand which comprises a base member for detachably mounting on said external object, an adjustable frame having a supporting platform, and being adapted for detachably and adjustably mounting said mobile device; and an adaptive mounting arrangement, which comprises a mounting connector provided on said adjustable frame, and comprising a tubular mounting member having a mounting cavity, said mobile device stand being selectively operated between a stationary mode and a mobile mode, wherein in said stationary mode, said tubular mounting member is arranged to detachably attached on said base member so as to detachably mount said adjustable frame on said supporting stand, wherein in said mobile mode, said tubular mounting member is arranged to securely and detachably mount on a cap portion of a bottle through insertion of said cap portion in said mounting cavity so as to detachably mount said adjustable frame on said bottle, said tubular mounting member further having a securing seat formed at a top portion thereof, wherein said securing seat forms a protrusion in said mounting cavity for being inserted into a bottle opening of said bottle, said base member having a peripheral mounting portion and an engagement mounting portion upwardly and integrally extended from said peripheral mounting portion, said engagement mounting portion being sized and shaped to correspond to that of said tubular mounting member, said supporting stand having a plurality of connectors provided on a bottom surface of said peripheral mounting portion of said base member for connecting with said external object, said adjustable frame comprising a stationary clamping member, a connecting frame member movably mounted to said stationary clamping member and said tubular mounting member of said mounting connector in such a manner that said stationary clamping member is arranged to pivotally move with respect to a transverse axis thereof, and a movable clamping member movably mounted on said stationary clamping member for defining a clamping cavity formed between said stationary clamping member and said movable clamping member, said stationary clamping member having a first longitudinal portion and a first transverse portion extended from a lower end of said first longitudinal portion to form a substantially L-shape contour, said movable clamping member having a second longitudinal portion slidably and adjustably mounted on said first longitudinal portion of said stationary clamping member, and a second transverse portion extended from an upper end of said second longitudinal portion.

2. A mobile device stand for supporting a mobile device on an external object, comprising:

a supporting stand which comprises a base member for detachably mounting on said external object;

an adjustable frame having a supporting platform, said adjustable frame being adapted for detachably and adjustably mounting said mobile device; and an adaptive mounting arrangement, which comprises a mounting connector provided on said adjustable frame, and comprising a tubular mounting member having a mounting cavity, said mobile device stand being selectively operated between a stationary mode and a mobile mode, wherein in said stationary mode, said tubular mounting member is arranged to detachably attached on said base member so as to detachably mount said adjustable frame on said supporting stand, wherein in said mobile mode, said tubular mounting member is arranged to securely and detachably mount on a cap portion of a bottle through insertion of said cap portion in said mounting cavity so as to detachably mount said adjustable frame on said bottle, said tubular mounting member having a tapered cross-sectional shape so that a diameter of said tubular mounting member gradually increases from a top portion to a bottom portion thereof, said tubular mounting member further having a securing seat formed at a top portion thereof, said securing seat forming a protrusion in said mounting cavity for being inserted into a bottle opening of said bottle, said base member having a peripheral mounting portion and an engagement mounting portion upwardly and integrally extended from said peripheral mounting portion, said engagement mounting portion being sized and shaped to correspond to that of said tubular mounting member, said supporting stand having a plurality of connectors provided on a bottom surface of said peripheral mounting portion of said base member for connecting with said external object, said adjustable frame comprising a stationary clamping member, a connecting frame member movably mounted to said stationary clamping member and said tubular mounting member of said mounting connector in such a manner that said stationary clamping member is arranged to pivotally move with respect to a transverse axis thereof, and a movable clamping member movably mounted on said stationary clamping member for defining a clamping cavity formed between said stationary clamping member and said movable clamping member, said stationary clamping member having a first longitudinal portion and a first transverse portion extended from a lower end of said first longitudinal portion to form a substantially L-shape contour, said movable clamping member having a second longitudinal portion slidably and adjustably mounted on said first longitudinal portion of said stationary clamping member, and a second transverse portion extended from an upper end of said second longitudinal portion.

* * * * *